April 15, 1930. R. E. SWANN 1,754,339
COMBINED VENTILATOR AND SUN SHIELD
Filed July 15, 1927
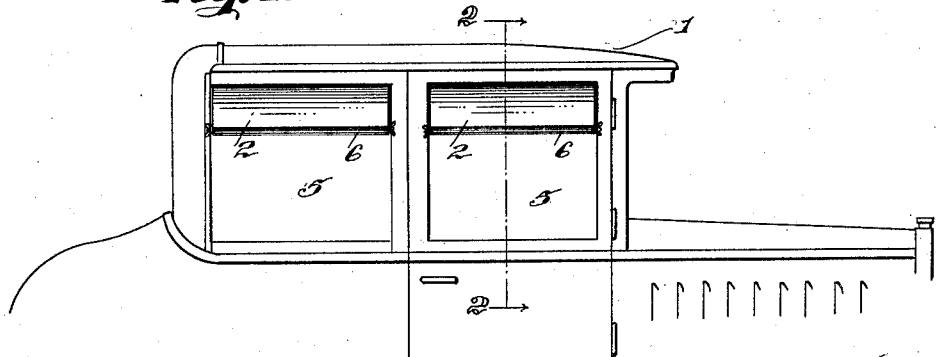
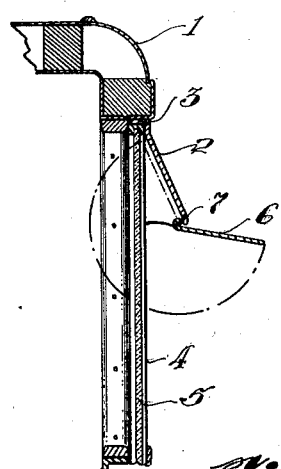
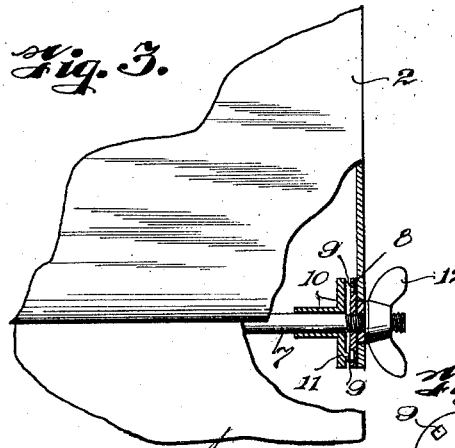
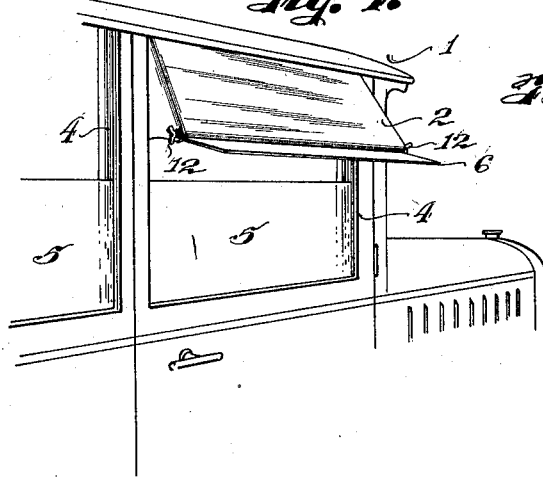
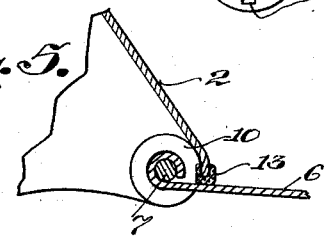
Richard E. Swann
INVENTOR.
BY
ATTORNEY.

Patented Apr. 15, 1930

1,754,339

UNITED STATES PATENT OFFICE

RICHARD ERNEST SWANN, OF DALLAS, TEXAS

COMBINED VENTILATOR AND SUN SHIELD

Application filed July 15, 1927. Serial No. 205,991.

This invention relates to automobile accessories and it refers more particularly to a combined ventilator and sun shield and the principal object of the invention resides in a hood adapted to be stationarily attached to the upper part of the window of a closed vehicle, whereby the glass may be slightly lowered to allow entrance and circulation of air in inclement weather and to prevent the entrance of rain.

Another object of the invention resides in the provision of a sun shield to protect the occupants of the vehicle from the sun's rays, said shield being so arranged relative to the hood as to be capable of adjustment at various angles.

Still another object of the invention resides in the provision of an improved means for retaining the shield in adjusted positions and in inoperative position with respect to the hood when not required.

Broadly, the invention comprehends the provision of an accessory such as described which, when mounted upon a vehicle, will furnish the maximum of comfort in providing, as it does, a complete ventilation of the automobile in rainy weather, as well as affording an effective shield against sun rays, very annoying to the motorist. Moreover, the invention, when operatively applied, affords an accessory of pleasing appearance and does not in any respect, interfere with the comfort of the occupants of the vehicle.

With the foregoing objects as primary, the invention has particular reference to its salient features of construction and arrangement of parts through which the foregoing objects are attained and which will become manifest as the description proceeds, taken in connection with the accompanying drawings; wherein:—

Figure 1 represents a fragmentary side elevational view of an automobile showing the invention installed.

Figure 2 is a sectional view on lines 2—2 of Figure 1.

Figure 3 is a fragmentary view of the hood and shield showing the hinge joint in section to illustrate the means of locking the shield in adjusted positions.

Figure 4 is a fragmentary view in perspective of a vehicle equipped with the improved ventilation and shield.

Figure 5 is a fragmentary view in section of the hinged joint intermediate the hood and shield, and Figure 6 is a detail view of the recessed disc, a part of the shield locking means.

Continuing now more in detail with the drawings, 1 designates a motor vehicle of the closed type, shown in Figures 1 and 4. With reference particularly to Figure 2, the hood 2 is preferably composed of a single piece of material, metal being preferred for the sake of stability, and is so formed as to provide closed sides and an integral flange 3. The glass channels 4 of the vehicle are removed in installing the hood in order that the flanges 3 may be inserted in the window and the channel replaced, using the fastening screws of the latter to hold the flanges in place. The hood so applied, extends outward near the bottom thereof so that air may enter beneath the hood when the window glass 5 is slightly lowered. It is thus impossible for rain to enter the car. The hood, as can be seen from comparing Figs. 2 and 4 has its sides and bottom disposed in front of the glass channels 4 so that the window may be moved above the bottom of the hood and be fully closed or partially opened so as to permit air to enter from above the bottom of the hood.

While the hood 2 very effectively prevents entrance of rain, it is not of such size as to shield the occupants of the vehicle against the sun's rays, and it is desirable that such a shield be adjustable to any angle. For this latter purpose, a wing 6 is provided to extend the hood 2, and shown clearly in Figure 4.

As apparent in Figure 5, a rod 7 extends the length of the hood 2 near its lower end and upon which the wing 6 is rigidly mounted. This arrangement permits the wing 6 to swing in the manner illustrated in Figure 2 in dotted lines. It is desirable that means be provided to securely lock the wing in predetermined positions with respect to the hood, one on the approximate plane shown in Figure 2, another on a plane equal to the angle of the hood, another on a vertical plane and still another in inoperative position shown in Figure 2 in dotted lines, beneath the hood. It is apparent, when in the latter position, that the sun shield 6 is entirely out of sight, leaving only the hood 2 in view. On cloudy days, and in night driving, this feature enables the motorist to drive without having his view obstructed.

The locking means referred to is clearly shown in Figure 3 especially and consists of a disc 8 fixed to the side of the hood 2, to permit of unrestricted passage of threaded end of the rod 7. This disc, as shown in Figure 6 is provided with recesses 9, at the angles referred to in the foregoing. A companion disc 10 is rigidly fixed upon the rod 7 and is provided with a projection 11 corresponding with the recesses in the disc 8 when the wing 6 is moved radially with respect to the hood. When the desired angle of the wing is attained, the wing nut 12 is advanced, urging the disc 8 toward the disc 10, interlocking the projection 11 in one of the recesses 9. Such a locking arrangement is provided on either end of the hood.

While maximum rigidity is obtained through the locking means described, a means such as shown in Figure 5 in the form of a rubber cushion 13 is provided to be applied to the hood 2, and against which the wing 6 presses when moved to the extreme outer position, as shown also in this figure, and through which possible vibration is dispensed with.

It is apparent from the foregoing that a very effective ventilating hood is provided by the invention, as well as an adjustable sun shield which may be moved to inoperative position when not in use, and in such position is entirely unexposed.

Manifestly, the construction shown is capable of considerable modification and such modification as is in keeping with the appended claim is also considered within the spirit of the invention.

What is claimed is—

In a device of the type set forth, a hood having a top and ends, the front side edge portion of the top being free and extended downwardly, a U-shaped cushioning member receiving said free side of the top therein, a rod extending through said ends of the hood, and disposed substantially in the plane of said free edge of the top and located at a distance rearwardly of said edge, a wing secured to the rod, and means to secure the rod to the hood ends thereby to hold the wing in different adjusted positions, said wing being engageable with said cushioning member and the bottom of the latter extending below and at a spaced distance in front of the rod to protect the rod.

In testimony whereof I affix my signature.

RICHARD ERNEST SWANN.